(12) United States Patent
Kato et al.

(10) Patent No.: US 6,523,805 B2
(45) Date of Patent: Feb. 25, 2003

(54) AIR PASSAGE SWITCHING DOOR

(75) Inventors: Mitsutoshi Kato, Toyota (JP);
Yasuhiro Sato, Okazaki (JP); Yutaka Ichitani, Anjo (JP); Kunio Nakashima, Toyota (JP); Hiroyuki Saito, Toyota (JP)

(73) Assignees: Denso Corporation, Kariya (JP); Shimazu Industry Co., Ltd., Kariya (JP)

( * ) Notice: Subject to any disclaimer, the term of this patent is extended or adjusted under 35 U.S.C. 154(b) by 40 days.

(21) Appl. No.: 09/835,983

(22) Filed: Apr. 16, 2001

(65) Prior Publication Data

US 2002/0028649 A1 Mar. 7, 2002

(30) Foreign Application Priority Data

Apr. 27, 2000 (JP) ........................................ 2000-128256

(51) Int. Cl.[7] ............................................... F16K 1/226
(52) U.S. Cl. ............................................ 251/306; 454/69
(58) Field of Search ........................... 454/69; 251/306; 264/261, 263, 46.4; 156/280

(56) References Cited

U.S. PATENT DOCUMENTS 461,206 A * 10/1891 Goll ............................. 251/306
4,994,226 A   2/1991 Nakagawa et al.
6,047,951 A * 4/2000 Ito et al. ....................... 251/308

* cited by examiner

Primary Examiner—Harold Joyce
(74) Attorney, Agent, or Firm—Harness, Dickey & Pierce, PLC

(57) ABSTRACT

In an air passage switching door, a packing material having a size approximately corresponding to a plate surface of a door base member is used, and the door base member is crossed with the packing material at a portion around a rotation shaft for rotating the door base member, so that both plate portions of the door base member are bonded to opposite surfaces of the packing material at different areas of the packing material. Accordingly, the air passage switching door can be manufactured using the single packing material in low cost, while having a reduced thickness.

5 Claims, 9 Drawing Sheets

AIR PASSAGE SWITCHING DOOR

CROSS-REFERENCE TO RELATED APPLICATION

This application relates to and claims priority from Japanese Patent Application No. 2000-128256 filed on Apr. 27, 2000.

BACKGROUND OF THE INVENTION

1. Field of the Invention

The present invention relates to an air passage switching door for opening and closing an air passage through which air flows. More particularly, the present invention relates to a method for manufacturing the air passage switching door for a vehicle air conditioner.

2. Related Art

In a conventional method of an air passage switching door described in U.S. Pat. No. 4,994,226, both stacked packing materials are disposed in a mold space of a forming die, and a melted resin material is injected between both the packing materials to form a door base plate, so that both the packing materials are bonded integrally to both surfaces of the door base plate. However, in this case, thickness of the air passage switching door becomes thicker due to the thickness of both the packing materials, and a pressure loss or an air-blowing noise of the air passage may become larger.

SUMMARY OF THE INVENTION

In view of the foregoing problems, it is an object of the present invention to provide an air passage switching door which is formed in low cost using a single packing material while having a reduced thickness.

It is an another object of the present invention to provide a method for readily manufacturing the air passage switching door.

According to the present invention, in an air passage switching door for opening and closing an air passage, a single packing material having a size approximately corresponding to a plate surface of a door base member is used, a rotation shaft is disposed integrally with the door base member at a center portion of the door base member so that the door base member is rotatable around the rotation shaft, and the door base member and the packing material are disposed to be crossed with each other around the rotation shaft in such a manner that, the packing material is bonded onto both one side surface of the first plate portion of the door base member, and onto one side surface of the second plate portion, opposite to the one side surface of the first plate portion. Accordingly, even in the air passage switching door using the single packing material, the packing material can be bonded onto opposite surfaces of the first and second plates, respectively. Therefore, the air passage switching door has a reduced thickness, and is formed in low cost using the single packing material.

According to a method for manufacturing the air passage switching door, the method includes a first step for placing the single packing material having the size approximately corresponding to the door base member in a forming die, and a second step for forming the door base member and the rotation shaft by injecting a melted resin onto both side surfaces of the packing material. In the second step, the melted resin is injected onto one side area of the packing material among one side surface of the packing material, and is injected onto the other side area of the packing material among the other side surface of the packing material, to form the door base member crossed with the packing material. Accordingly, the air passage switching door can be readily manufactured in low cost using the single packing material to have a reduced thickness.

Preferably, in the second step, the melted resin passes through a first communication hole provided at a center portion of the packing material to form a connection portion connecting the first and second plate portions of the door base member. Therefore, the connection portion can be extended obliquely relative to both surfaces of the first and second plate portions.

More preferably, in the second step, the melted resin is injected to the other side surface of the packing material at the other side area of the packing material through a second communication hole provided in the packing material at a position shifted from the center portion. Therefore, it is possible to form the first and second plate portions at both sides of the packing material using one side injection of the melted resin. Accordingly, the injection of the melted resin can be readily performed, and producing performance of the air passage switching door can be improved.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PREFERRED EMBODIMENT

A preferred embodiment of the present invention will be now described with reference to the accompanying drawings. An air conditioning unit 10 of a vehicle air conditioner is disposed in a passenger compartment at an approximately center portion of an instrument panel (not shown) in a vehicle width direction (i.e., right-left direction). The instrument panel is disposed in a front part of the passenger compartment of the vehicle. In the first embodiment, the air conditioning unit 10 is installed in the vehicle to correspond to an arrangement direction of FIG. 1.

Figure 1:
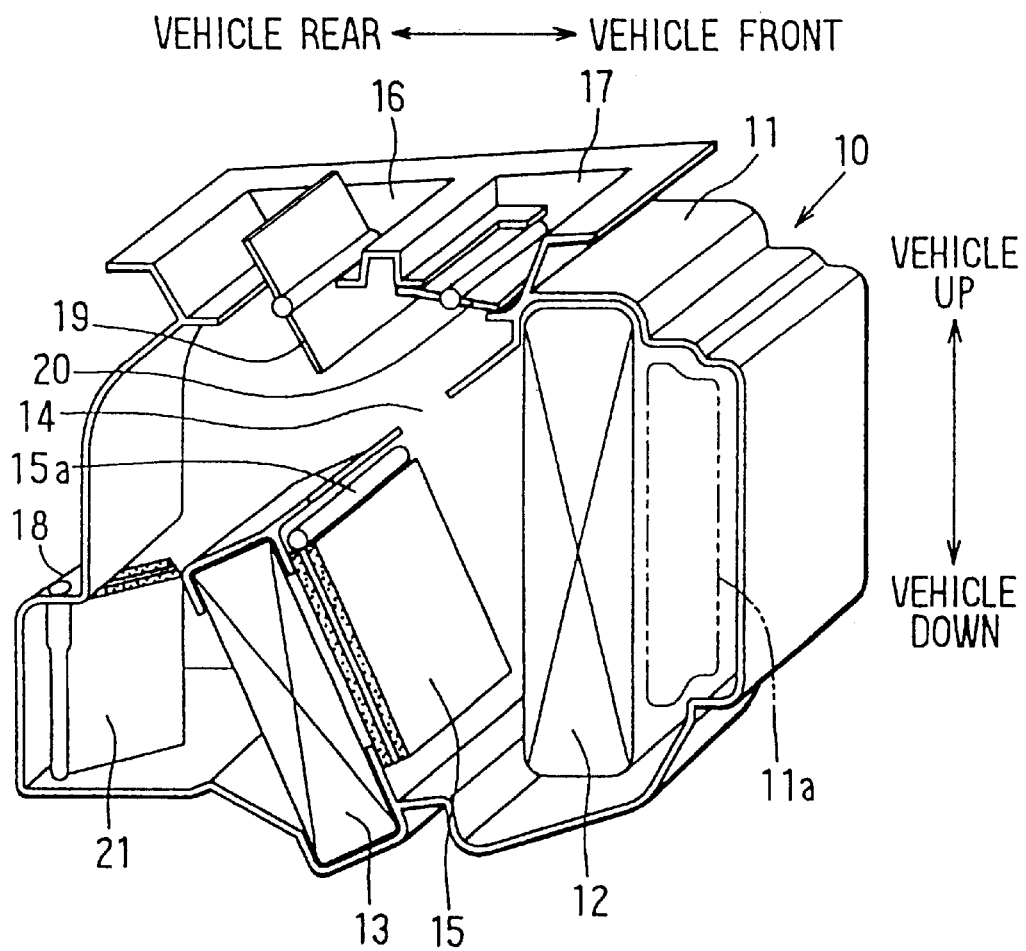
FIG. 1 is a schematic perspective view showing an air conditioner for a vehicle according to a preferred embodiment of the present invention.

A blower unit (not shown) is disposed in the passenger compartment at a front passenger's seat side shifted from the air conditioning unit 10 in the vehicle width direction. As shown in FIG. 1, the air conditioning unit 10 has an air conditioning case 11 which defines an air passage for leading air toward the passenger compartment. An air inlet 11a through which air is introduced into the air conditioning case 11 is formed at a most front portion of the air conditioning case 11. An outlet of the blower unit is connected to the air inlet 11a of the air conditioning case 11, so that air blown by the blower unit flows into the air conditioning case 11 through the air inlet 11a. Air introduced into the air conditioning case 11 is cooled by an evaporator 12 of a refrigerant cycle, and then is heated by a heater core 13 which heats air using hot water (i.e., engine-cooling water) as a heating source. An amount of air passing through the heater core 13 and an amount of air bypassing the heater core 13 are adjusted by a plate-like air mixing door 15 so that the temperature of air to be blown into the passenger compartment is adjusted to have a predetermined temperature.

The air mixing door 15 is rotated by a rotation shaft 15a in the air conditioning case 11. A ratio between an amount of air passing through the heater core 13 and an amount of air passing through a bypass passage 14 through which air bypasses the heater core 13 is adjusted by controlling a rotation position of the air mixing door 15. The conditioned air is blown into the passenger compartment through at least one of three opening portions formed in the air conditioning case 11. The three opening portions are a face opening 16 through which air is blown toward the head portion of a passenger in the passenger compartment, a defroster opening 17 through which air is blown toward an inner surface of a windshield of the vehicle, and a foot opening 18 through which air is blown toward the foot portion of the passenger.

The face opening 16, the defroster opening 17 and the foot opening 18 are opened and closed, respectively, by a face door 19, a defroster door 20, and a foot door 21. The face door 19 and the defroster door 20 are butterfly doors. As shown in FIG. 2, each of the butterfly doors 19, 20 has a rotation shaft 31 disposed at a center of a door base plate 30.

The door base plate 30 is formed into an approximate rectangular plane shape by a resinous material having a high rigidity. The rotation shaft 31 for rotating the door base plate 30 is integrally formed with the door base plate 30 to extend in a longitudinal direction of the door base plate 30, and is disposed at a center of the door base plate 30 in a lateral direction (i.e., minor-diameter direction) of the door base plate 30. Hereinafter, both side ends of each door 19, 20 in the lateral direction are referred to as lateral side ends, and both side ends of each door 19, 20 in the longitudinal direction are referred to as longitudinal side ends. The rotation shaft 31 extends in the longitudinal direction, and protrudes from both the lateral side ends of the door base plate 30 in a column shape.

Figure 4A:
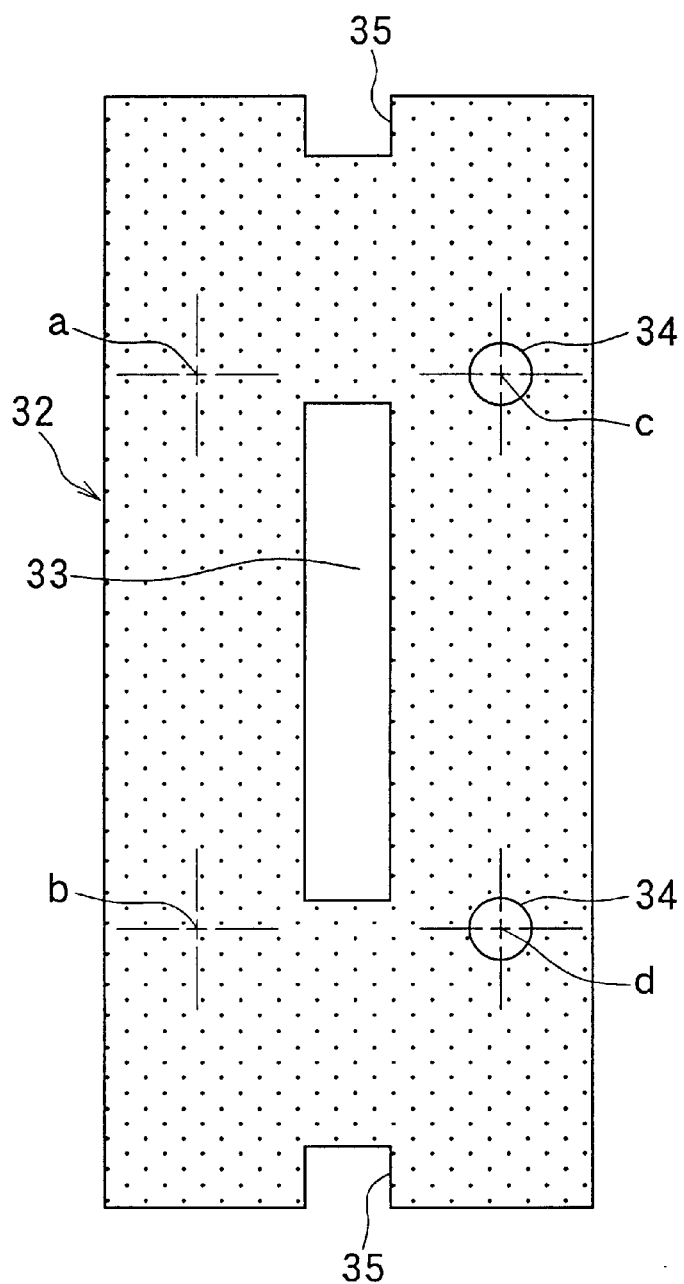
FIGS. 4A and 4B are a plan view and a side view, respectively, showing a single packing material according to the embodiment.
Figure 4B:
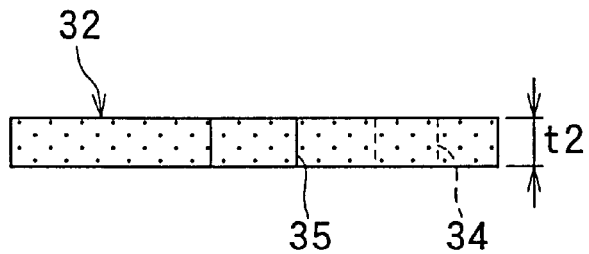

FIGS. 4A and 4B show a shape of a single packing material 32 before the door base plate 30 is resin-molded. As shown in FIGS. 4A, 4B, the packing material 32 (i.e., seal member) for sealing is a single plate material having a plan shape approximately corresponding to the rectangular shape of the door base plate 30. At a center portion of the packing material 32, a first communication hole 33, through which a melted resin material passes during a molding of the door base member 30, is opened beforehand. In this embodiment, a single rectangular hole is provided on an axial line of the rotation shaft 31, and is used as the first communication hole 33. However, plural communication holes 33 can be provided on the axial line of the rotation shaft 31 at plural positions. Further, the shape of the first communication hole 33 can be changed.

Figure 5:
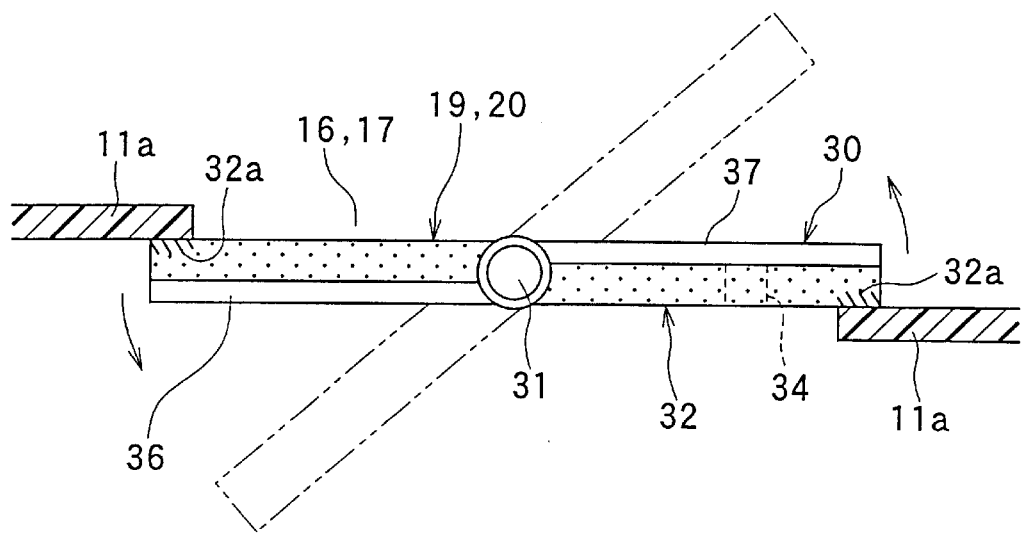
FIG. 5 is an enlarged sectional view showing a part around the butterfly door in the air conditioner, according to the embodiment.

In addition, second communication holes 34, through which a melted resin material injected from a molding gate 44 (see FIGS. 6–9) passes are opened in the packing material 32 beforehand. Each second communication hole 34 is opened at a position inside a sealing surface 32a (i.e., contact surface, see FIG. 5) in an outer peripheral portion of the packing material 32. As shown in FIG. 5, the sealing surface 32a of the outer peripheral portion of the packing 32 is the contact surface contacting a contact portion 11a of the air conditioning case 11 of the air conditioning unit 10. In this embodiment, because each second communication hole 34 is provided in an inside area shifted from the sealing surface 32a of the outer peripheral portion of the packing 32, the second communication holes 34 do not affect a sealing effect of the packing material 32. Here, plural second communication holes 34 can be provided in accordance with the positions of the molding gates 44, as shown in FIG. 4.

Both recess portions 35 are formed in lateral side ends of the packing material 32 at center positions of the lateral side ends, respectively. By providing the recess portions 35 in the packing material 32, a thickness of each connection portion 31a at which the door base plate 30 and the rotation shaft 31 are connected can be made thicker than that of door base plate 30, and thereby reinforcing the connection portions 31a. The first communication hole 33, the second communication holes 34 and the recess portion 35 can be formed in the packing material 32 by pressing or the like.

The butterfly door 19, 20 indicated by the solid line position in FIG. 5 is in a door closing state where the seal surface 32a of the packing material 32 of each butterfly door 19, 20 press-contacts the contact portion (sealing surface) 11a of the air conditioning case 11. When an operation force is applied to the rotation shaft 31 in a rotation direction from the door closing state, and the butterfly door 19, 20 rotates in counterclockwise direction by a predetermined angle, the packing material 32 of each butterfly door 19, 20 is separated from the contact portion of the air conditioning case 11 and the opening 16, 17 is opened.

Figure 3:
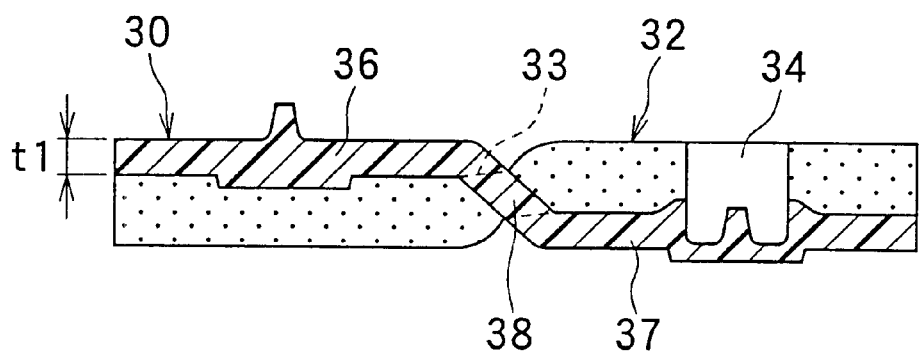
FIG. 3 is a cross-sectional view taken along line III—III in FIG. 2A.

As shown in FIG. 3, the door base member 30 has both plate portions 36, 37 partitioned at both sides relative to the rotation shaft 31, and a connection portion 38. The connection portion 38 is formed between the plate portions 36, 37, and is extended to be tilted relative to the plate portions 36, 37, so that the plate portions 36, 37 are integrally connected by the connection portion 38.

The packing material 32 is bonded to a surface (i.e., lower surface in FIG. 3) of the plate portion 36 at one side of the door base member 30, and to a surface (i.e., upper surface in FIG. 3) of the plate portion 37 at the other side opposite to the one side of the door base member 30. Accordingly, as shown in FIG. 3, the door base member 30 and the packing material 32 are crossed with each other at a position on the axial line of the rotation shaft 31.

The door base member 30 is made of a resinous material such as polypropylene, nylon and ABS resin. A filler such as glass fiber may be mixed into the resin material of the door base member 30 to enhance a strength of the door base member 30. A thickness t1 of the door base member 30, shown in FIG. 3, is 2.0 mm, for example. On the other hand, the packing material 32 is made of an elastic material. Preferably, the packing material is made of a porous elastic material such as ether urethane foam. For example, a thickness of the packing material 32 in a free state shown in FIG. 4B is 2.0 mm.

Next, a method for manufacturing the door 19, 20 will be now described. As shown in FIGS. 6–9A, a forming die for forming the door 19, 20 is constructed by an upper mold 40 and a lower mold 41. In this embodiment, the upper mold 40 is a movable mold, and the lower mold 41 is a stationary mold. A mold space 42 for molding a door is defined by a wall surface 40a of the upper mold 40 and a wall surface 41a of the lower mold 41. Plural injection gates 43, 44 for injecting a melted resin material forming the door base member 30 are set at plural positions.

Figure 2A:
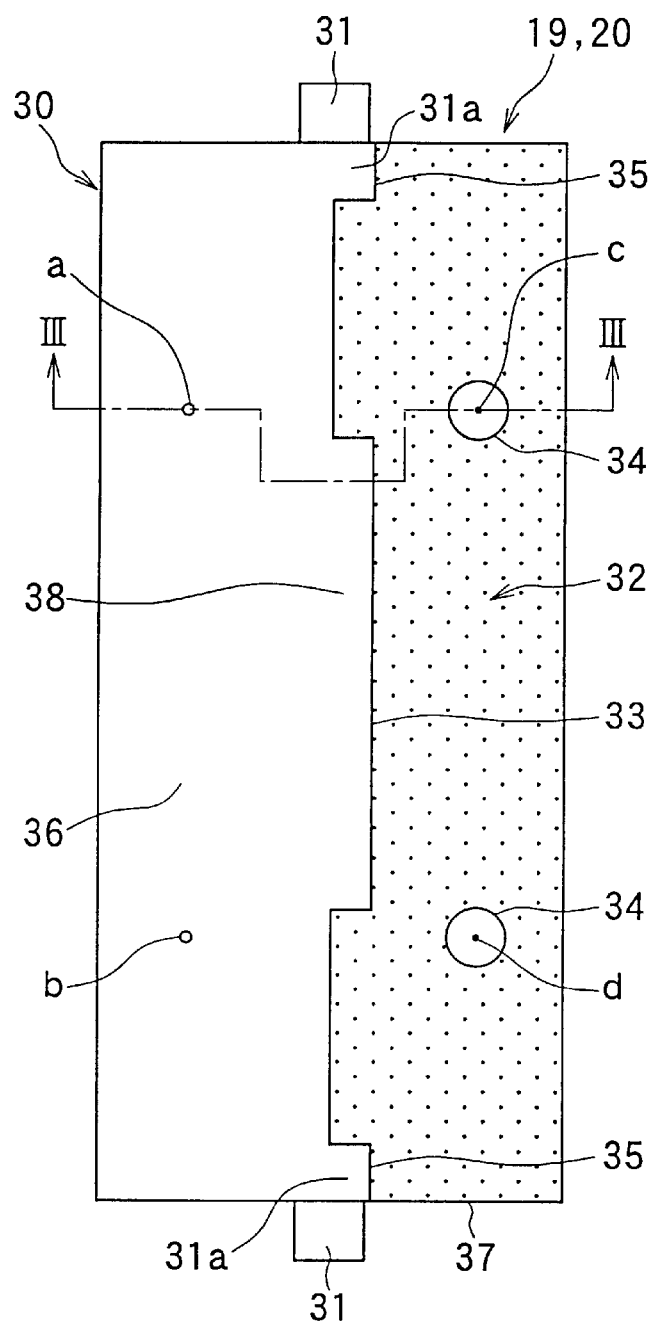
FIGS. 2A and 2B are a plan view and a side view, respectively, showing a butterfly door used for the air conditioner of FIG. 1.

The injection gate 43 is for injecting the melted resin material onto a surface (i.e., upper surface) of one side area (e.g., left side area in FIG. 4A) of the packing material 32, and the injection gate 44 is for injecting the melted resin material onto a surface (i.e., lower surface) of the other side area (e.g., right side area in FIG. 4A) of the packing material 32. In FIGS. 2A and 4A, positions indicated by "a" and "b" are positions at which the injection gates 43 are set, and positions indicated by "c" and "d" are positions at which the injection gates 44 are set. In this embodiment, both the injection gates 43 and both the injection gates 44 are provided so that the melted resin material are supplied from a nozzle (not shown) of a forming machine to the injection gates 43 and 44 simultaneously.

Figure 6:
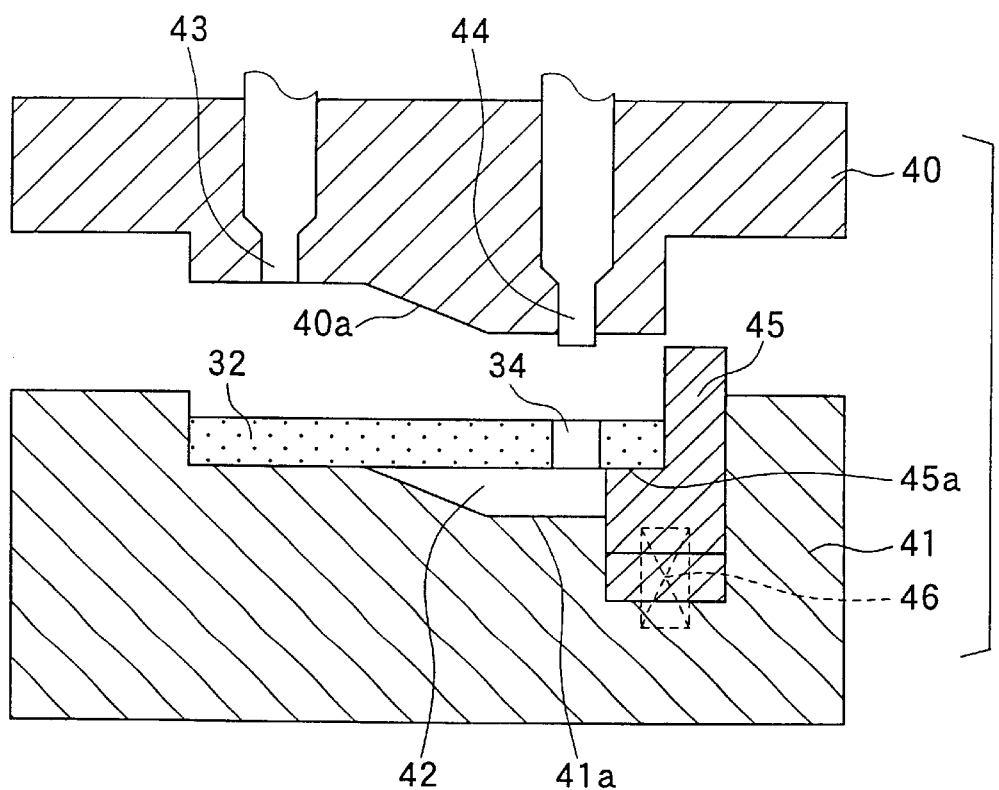
FIG. 6 is a schematic sectional view showing an opened state of a forming die used in a manufacturing method of the embodiment.

Next, door forming steps according to this embodiment will be now described. For forming a butterfly door 19, 20 shown in FIGS. 2A and 2B, the packing material 32 is formed into a single plate shape shown in FIGS. 4A and 4B, beforehand. Thereafter, as shown in FIG. 6, while the upper mold 40 and the lower mold 41 are opened, the packing material 32 shown in FIG. 4A is located on the wall surface 41a of the lower mold 41 at a predetermined position to be inserted between the upper mold 40 and the lower mold 41 in a packing inserting step (first step).

The wall surface 41a of the lower mold 41 has a shape corresponding to a molding shape of the door base member 30. That is, the wall surface 41a has both upper and lower horizontal surfaces with different heights, and a tilt surface connecting the both horizontal surfaces. A holding member 45 is disposed in the lower mold 41 at a side of the lower horizontal surface in the wall surface 41a of the lower mold 41. The holding member 45 has a step portion with a step surface 45a, and a coil spring 46 is provided so that a height position of the step surface 45a is adjusted. In the packing insertion step, the coil spring 46 adjusts the height position of the step surface 45a to be the same height as the upper horizontal surface in the wall surface 41a of the lower mold 41. Accordingly, one end (i.e., right end in FIG. 6) of the packing material 32 is placed on the step surface 45a of the holding member 45, and the other end (i.e., left end in FIG. 6) of the packing material 32 is placed on the upper horizontal surface of the wall surface 41a, so that the packing material 32 is positioned horizontally at the predetermined position within the lower mold 41. Because the coil spring 46 is disposed to push the holding member 45 upwardly, the horizontal state of the packing material 32 can be readily set.

Figure 7:
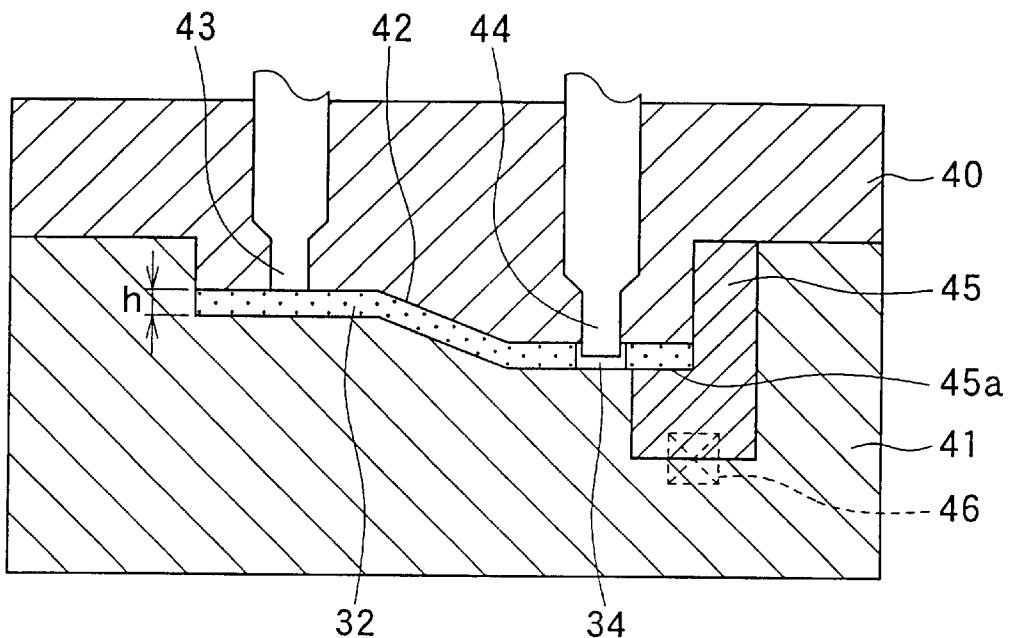
FIG. 7 is a schematic sectional view showing a closed state of the forming die according to the embodiment.
Figure 9A:
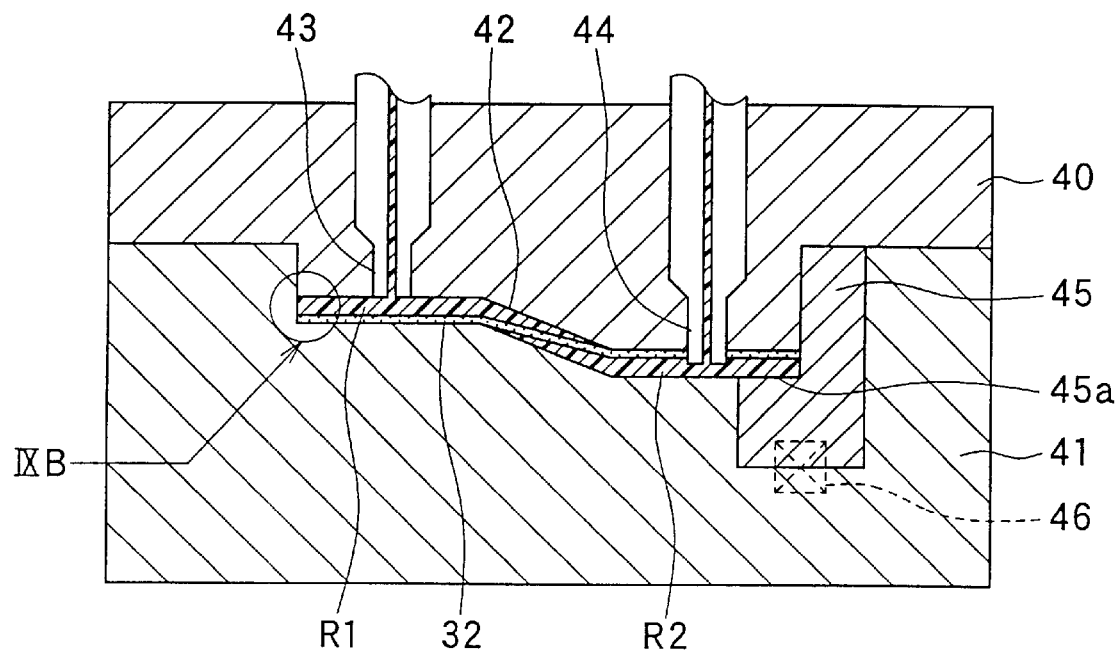
FIG. 9A is a schematic sectional view showing a state after finishing the injection of the melted resin material, according to the embodiment.
Figure 9B:
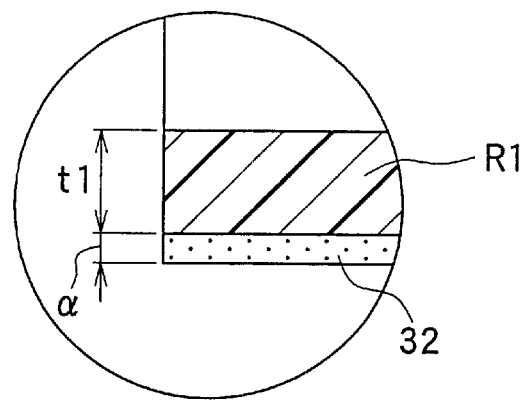
FIG. 9B is an enlarged view of the portion indicated by IXB in FIG. 9A.
Figure 11:
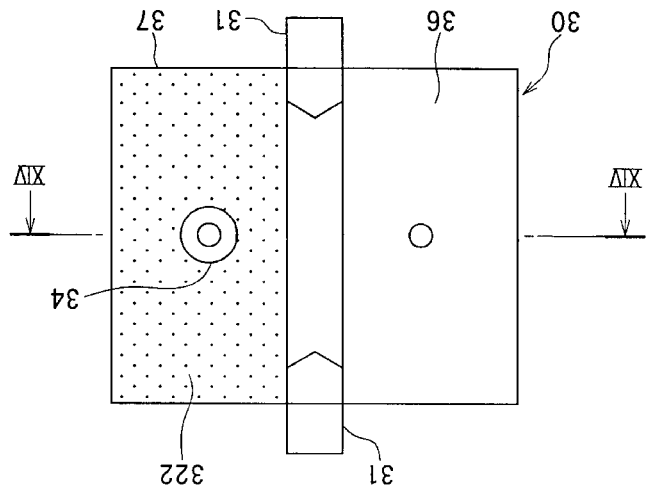
FIG. 11 is a plan view of a butterfly door experimentally manufactured by the inventors of the present invention.

Next, as shown in FIG. 7, the upper mold 40 is fastened relative to the lower mold 41 by moving the upper mold 40 downwardly, in a mold fastening step (pressing step). FIG. 7 shows the fastened state after the upper mold 40 is fastened (pressed) relative to the lower mold 41. In this fastened state shown in FIG. 7, the mold space 42 between the upper mold 40 and the lower mold 41 has a height h (h=t1+α) that is slightly thicker than the plate thickness t1 by a slight amount α, as shown in FIGS. 9A and 9B. Therefore, the thickness of the packing material 32 is reduced from the dimension t2 in the free state shown in FIG. 4B to the dimension h shown in FIG. 7.

During the mold fastening step, while the upper mold 40 moves downwardly, top protrusions of the injection gates 44 are firstly inserted into the second communication holes 34 of the packing material 32, and the upper mold 40 contacts the top surface of the holding member 45 while the insertion states of the top protrusions of the injection gates 44 into the second communication holes 34 are maintained. Accordingly, the upper mold 40 presses downwardly the holding member 45, and the coil spring 46 is compressed so that the step surface 45a of the holding member 45 is lowered and is placed on the same surface as the lower horizontal surface of the wall surface 41a of the lower mold 41, as shown in FIG. 7.

Figure 8:
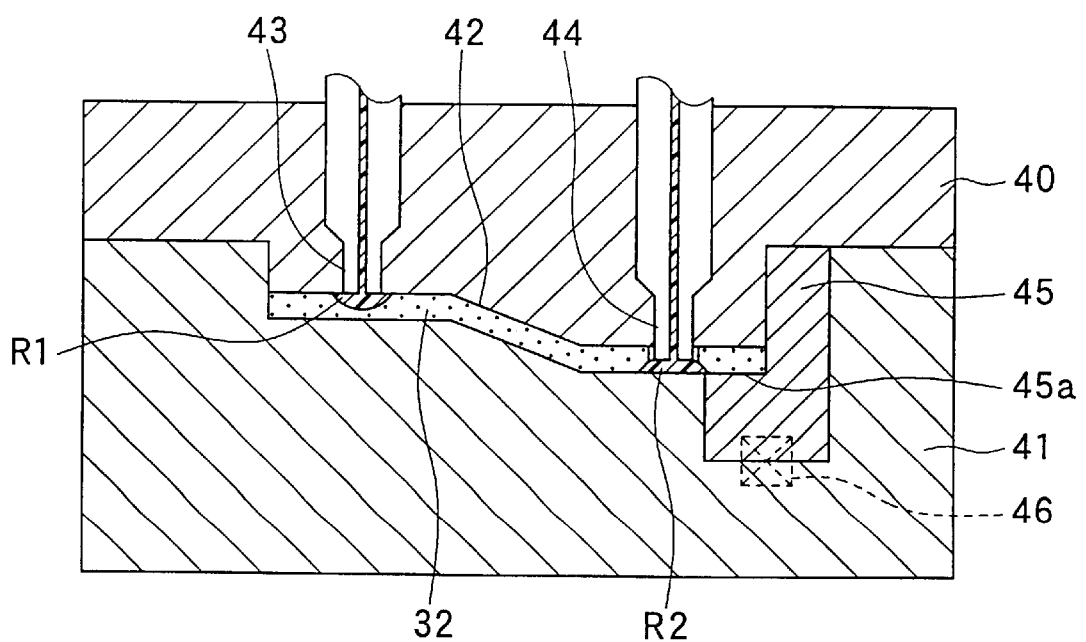
FIG. 8 is a schematic sectional view showing a state of the forming die, immediately after an injection of a melted resin material, according to the embodiment.

Next, in this fastened state shown in FIG. 7, the melted resin material is supplied from the nozzle of the forming machine, is branched into the four injection gates 43, 44, and is injected simultaneously into the mold space 42 by a predetermined injection pressure, in an injection step. FIG. 8 shows a state immediately after a start of the injection of the melted resin material. As shown in FIG. 8, the melted resin material is injected onto one surface (upper surface) of the packing 32 from both the gates 43 at the left side positions a, b in FIG. 4A, and is injected onto the other side surface (lower surface) of the packing 32 from both the gates 44 at the right side positions c, d in FIG. 4A. In FIG. 8, R1 indicates the melted resin material immediately after being injected from each gate 43, and R2 indicates the melted resin material immediately after being injected from each gate 44.

By continuing the injection of the melted resin material, injection ranges of the melted resin material R1, R2 from each gates 43, 44 are gradually enlarged to be extended in an entire area of the mold space. While the resin injection area is enlarged, the melted resin material passes through the first communication hole 33 of the packing material 32, so that the melted resin material R1 on the one surface of the packing material 32 from the gates 43 and the melted resin material R2 on the other surface of the packing material 32 from the gates 44 are connected to each other.

FIG. 9A shows an injection finishing state after both the resin materials R1, R2 are connected through the first communication hole 33. That is, in the state of FIG. 9A, both resin materials R1, R2 are filled up within the mold space 42. FIG. 9B shows an enlarged portion indicated by IXB in FIG. 9A. As shown in FIGS. 9A and 9B, the packing material 32 is pressed by the injection pressures of the melted resin materials R1, R2 to have a little thickness α (e.g., 0.2 mm).

Figure 2B:
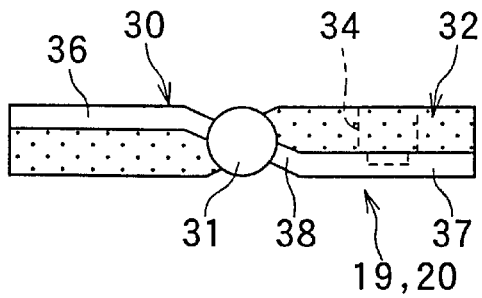

After the resin injection is finished as shown in FIGS. 9A and 9B, the finished state is held for a predetermined time period under a predetermined pressure of the mold space 42. From the injection of the melted resin material to the holding of the melted resin material, the temperature of the forming die is adjusted so that the melted resin material has a suitable fluidity. After the holding time passes, the forming die is cooled for a predetermined time period. Accordingly, as shown in FIGS. 2A, 2B and 3, the door base member 30 is integrally formed with the single packing material 32 at both surface sides, the packing material 32 is bonded to the plate portions 36, 37 of the door base member 30, and the rotation shaft 31 is formed integrally with the door base member 30.

Figure 10:
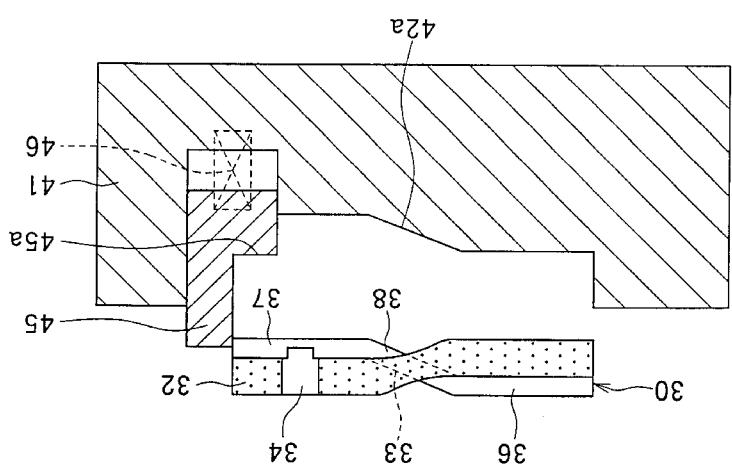
FIG. 10 is a schematic sectional view showing a removing of the butterfly door from the forming die, according to this embodiment.
Figure 12B:
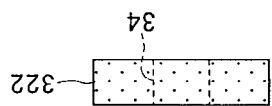
FIGS. 12A and 12B are a plan view and a side view, respectively, showing a single packing material used for one side of the butterfly door in FIG. 11.
Figure 12A:
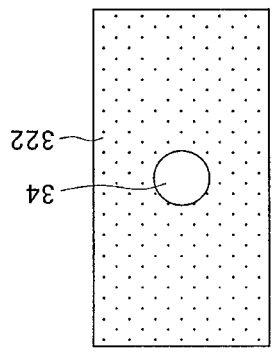
Figure 13B:
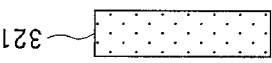
FIGS. 13A and 13B are a plan view and a side view, respectively, showing a single packing material used for the other side of the butterfly door in FIG. 11.
Figure 13A:
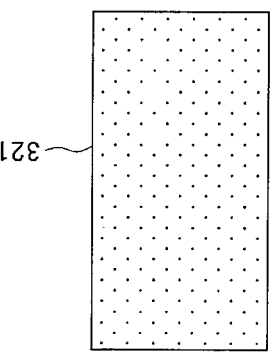

Next, the upper mold 40 is moved upwardly relative to the lower mold 41 in a mold opening step. Thereafter, the product (i.e., integrally-formed product of the packing material 32 and the door base member 30) is removed from the lower mold 41 as shown in FIG. 10 in a removing step. After the product is removed from the lower mold 41, the thickness of the packing material 32 is changed to approximately the original free thickness.

Figure 14:
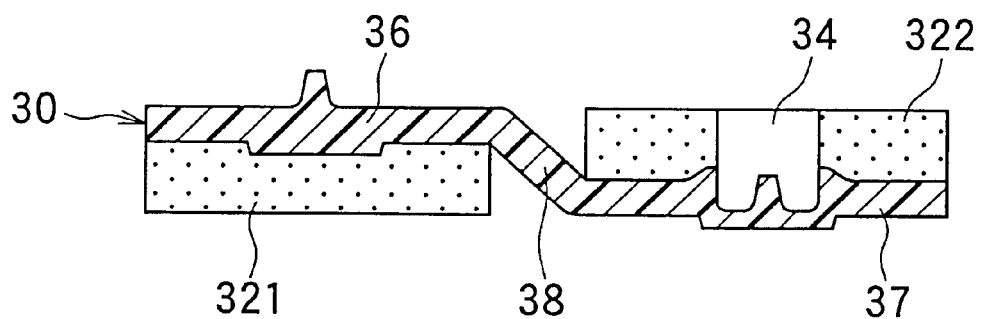
FIG. 14 is a cross-sectional view taken along line XIV—XIV in FIG. 11.

In this embodiment, using both packing materials 321, 322, the door 19, 20 may be formed as shown in FIG. 14. The inventors of the present invention perform the following experiment using both the packing materials 321, 322 for reducing the door thickness, as shown in FIGS. 11–14. That is, the packing material 321 is bonded to one side surface of the plate portion 36, and the packing material 322 different from the packing material 321 is bonded to the one side surface of the plate portion 37, opposite to the one side surface of the plate portion 36. However, when the door shown in FIG. 14 is formed by the method of this embodiment, because both the packing materials 321, 322 are greatly smaller than the mold space, both the packing materials 321, 322 are readily moved within the mold space. Therefore, it is difficult to accurately set the packing materials 321, 322 into the mold space, and a position shift of the packing materials 321, 322 is readily caused.

According to this embodiment of the present invention, because the single packing material 32 approximately corresponding to the shape of the lower mold 41 including the holding member 45 is used, the packing material 32 can be readily accurately located at a predetermined position within the forming die. Further, because the melted resin material is injected on both surface sides of the single packing material 32 to pass through the first communication hole 33, both the plate portions 36, 37 can be readily integrally connected to each other by the connection portion 38, and the door base member 30 and the rotation shaft 31 can be readily integrally formed.

Further, because the second communication hole 34 is provided in the packing material 32, the melted resin material can be injected to the back surface (the lower surface in FIGS. 6–8) of the packing material 32 at one side area of the packing material 32, while the melted resin material can be injected to the face side (the upper side in FIGS. 6–8) of the packing material 32 at the other side area of the packing material. Accordingly, by one side injection of the melted resin material, the plate portions 36, 37 can be formed at both sides of the packing material 32. Thus, the structure of the forming die for forming the door 19, 20 can be made simple, and door-producing performance can be improved.

Although the present invention has been fully described in connection with the preferred embodiment thereof with reference to the accompanying drawings, it is to be noted that various changes and modifications will become apparent to those skilled in the art.

For example, in the above-described embodiment, the present invention is typically used for the door 19, 20 for switching an air outlet mode. However, the present invention can be used for an air mixing door for adjusting temperature of air blown into the passenger compartment. Further, the door forming method of the present invention is not limited to the air passage switching door for a vehicle air conditioner, but may be applied to an air passage switching door of various use.

Such changes and modifications are to be understood as being within the scope of the present invention as defined by the appended claims.

What is claimed is:

1. An air passage switching door for opening and closing an air passage, comprising:

a door base member;

a rotation shaft disposed approximately at a center portion of the door base member to partition the door base member into first and second plate portions; and a single packing material having a size approximately corresponding to a plate surface of the door base member, wherein:

the door base member is disposed integrally with the rotation shaft to be rotatable around the rotation shaft; and the door base member and the packing material are disposed to be crossed with each other around the rotation shaft in such a manner that the packing material is bonded onto both one side surface of the first plate portion of the door base member, and onto one side surface of the second plate portion, opposite to the one side surface of the first plate portion.

2. The air passage switching door according to claim 1, wherein:

the packing material has a first communication hole at a center portion;

the door base member has a connection portion connecting both the first and second plate portions; and the connection portion is disposed to penetrate through the first communication hole of the packing material and to be tilted relative to both surfaces of the first and second plate portions.

3. The air passage switching door according to claim 2, wherein:

the packing material has a second communication hole at a side shifted from the first communication hole; and the second communication hole is provided in the packing material on one of the first and second plate portions.

4. The air passage switching door according to claim 1, wherein the door base member is made of a material having a rigidity higher than a predetermined value, and the packing material is made of an elastic material.

5. The air passage switching door according to claim 1, wherein the first plate portion and the second plate portion of the door base member are disposed at both opposite sides relative to the packing material.

* * * * *

UNITED STATES PATENT AND TRADEMARK OFFICE
CERTIFICATE OF CORRECTION

PATENT NO.    : 6,523,805 B2
DATED         : February 25, 2003
INVENTOR(S)   : Mitsutoshi Kato et al.

It is certified that error appears in the above-identified patent and that said Letters Patent is hereby corrected as shown below:

<u>Title page,</u>
Item [73], Assignees, "Shimazu Industry" should be -- Shimizu Industry --

Signed and Sealed this

Second Day of September, 2003

JAMES E. ROGAN
*Director of the United States Patent and Trademark Office*